(12) United States Patent
Garg et al.

(10) Patent No.: US 8,577,135 B2
(45) Date of Patent: Nov. 5, 2013

(54) SYSTEM AND METHOD FOR DETECTION OF SPECULARITY IN AN IMAGE

(75) Inventors: Kshitiz Garg, Pittsburgh, PA (US); Neil Alldrin, Pittsburgh, PA (US)

(73) Assignee: Tandent Vision Science, Inc., San Francisco, CA (US)

( * ) Notice: Subject to any disclaimer, the term of this patent is extended or adjusted under 35 U.S.C. 154(b) by 872 days.

(21) Appl. No.: 12/590,949

(22) Filed: Nov. 17, 2009

(65) Prior Publication Data

US 2011/0116710 A1 May 19, 2011

(51) Int. Cl.
*G06K 9/00* (2006.01)
*G06K 9/62* (2006.01)

(52) U.S. Cl.
USPC .......................................... 382/165; 382/224

(58) Field of Classification Search
None
See application file for complete search history.

(56) References Cited

U.S. PATENT DOCUMENTS

| | | | |
|---|---|---|---|
| 7,251,637 B1* | 7/2007 | Caid et al. ........................ 706/15 |
| 7,379,568 B2* | 5/2008 | Movellan et al. .............. 382/118 |
| 7,853,082 B2* | 12/2010 | Shimano et al. ............... 382/190 |
| 7,920,300 B2* | 4/2011 | Nakaya et al. ................. 358/474 |
| 8,086,007 B2* | 12/2011 | Yan et al. ....................... 382/128 |
| 8,144,546 B2* | 3/2012 | Lovik et al. .................... 367/139 |
| 2002/0128784 A1* | 9/2002 | Scheiner et al. ................. 702/57 |
| 2002/0156754 A1* | 10/2002 | Swimm ........................... 706/20 |
| 2004/0208359 A1* | 10/2004 | Pishva ........................... 382/162 |
| 2004/0251435 A1* | 12/2004 | Sawayama et al. ....... 250/559.16 |
| 2005/0047647 A1* | 3/2005 | Rutishauser et al. ......... 382/159 |
| 2005/0062965 A1* | 3/2005 | Scheiner et al. ............... 356/319 |
| 2005/0102246 A1* | 5/2005 | Movellan et al. ................ 706/12 |
| 2006/0082792 A1* | 4/2006 | Sezginer ........................ 356/625 |
| 2006/0104508 A1* | 5/2006 | Daly et al. ..................... 382/167 |
| 2007/0132759 A1* | 6/2007 | Mallick et al. ................. 345/426 |
| 2007/0176940 A1 | 8/2007 | Maxwell et al. .............. 345/589 |
| 2007/0242878 A1 | 10/2007 | Maxwell et al. .............. 382/168 |
| 2007/0263944 A1* | 11/2007 | Smith et al. ................... 382/276 |
| 2008/0180553 A1* | 7/2008 | Hassan-Shafique et al. . 348/234 |
| 2008/0247598 A1* | 10/2008 | Movellan et al. ............. 382/100 |
| 2009/0034835 A1 | 2/2009 | Maxwell et al. .............. 382/164 |

(Continued)

FOREIGN PATENT DOCUMENTS

| | | | | |
|---|---|---|---|---|
| JP | 06187443 A | * | 7/1994 | .............. G06F 15/70 |
| WO | WO2008/085815 | | 7/2008 | |

OTHER PUBLICATIONS

"Detecting Specular Surfaces on Natural Images," Andrey DelPozo, et al, IEEE Conference on Computer Vision and Pattern Recognition, 2007. CVPR '07, 2007, pp. 1-8.*

(Continued)

*Primary Examiner* — Wenpeng Chen
(74) *Attorney, Agent, or Firm* — Davidson, Davidson & Kappel, LLC; Felix L. D'Arienzo, Jr.

(57) ABSTRACT

In a first exemplary embodiment of the present invention, an automated, computerized method is provided for processing an image. According to a feature of the present invention, the method comprises the steps of providing an image file depicting an image, in a computer memory, assembling a feature vector for the image file, the feature vector containing information regarding a likelihood that a selected region of the image file is specular, providing a classifier derived from a computer learning technique, computing a classification score for the selected region of the image file, as a function of the feature vector and the classifier and classifying the region as being specular, as a function of the classification score.

33 Claims, 9 Drawing Sheets

(56) References Cited

U.S. PATENT DOCUMENTS

2009/0116713 A1* 5/2009 Yan et al. .................. 382/128
2009/0208108 A1* 8/2009 Shimano et al. ............ 382/190
2010/0104135 A1* 4/2010 Nakajima .................. 382/103

OTHER PUBLICATIONS

Todd Zickler et al., "Color Subspaces as Photometric Invariants," International Journal of Computer Vision, 79(1): 13-30, Aug. 2008.
Satya P. Mallick, Todd Zickler, David J. Kriegman, and Peter N. Belhumeur, *Specularity Removal in Images and Videos: A PDE Approach.*" Proc. European Conf. Computer Vision, May 2006.
Maxwell et al.: "A Bi-illuminant Dichromatic Reflection Model for Understanding Images," CVPR08 (1-8) (2008).
Frédo Durand and Julie Dorsey, "Fast Bilateral Filtering for the Display of High-Dynamic-Range Images," ACM Transactions of Graphics (Proceedings of the ACM SIGGRAPH '02 Conference), 2002.
Sylvain Paris and Frédo Durand, "A Fast Approximation of the Bilateral Filter using a Signal Processing Approach," European Conference on Computer Vision (ECCV '06), 2006.
Tappen et al.: "Recovering intrinsic images from a single image", IEEE Transactions on pattern analysis and machine intelligence, IEEE service center, Los Alamitos, CA, US, vol. 27, No. 9; Sep. 1, 2005, pp. 1459-1472.
Roger Goose et al.: "Ground truth dataset and baseline evaluations for intrinsic image algorithms", Computer Vision, 2009 IEEE 12$^{th}$ International conference on, Piscataway, NJ, USA, Sep. 29, 2009.
Yun-Chung Chung et al.: "Intrinsic Image Extraction from a single image", Journal of Information Science and Engineering, Taipei, TW, vol. 25, No. 6, Nov. 1, 2009, pp. 1939-1953.
Todd Zickler et al: "Color Subspaces as Photometric Invariants", International Journal of Computer Vision, Kluwer Academic Publishers, BO, vol. 79, No. 1, Oct. 30, 2007, pp. 13-30.

* cited by examiner

FIG. 1

Pixel Array for Storing Image Data

| | | | |
|---|---|---|---|
| P(1, 1) | P(1, 2) ••• | ••• | P(1, M) |
| P(2, 1) | P(2, 2) | | • |
| P(3, 1) | P(3, 2) | | • |
| ⋮ | | | |
| • | | | • |
| • | | | • |
| P(N, 1) | ••• | ••• | P(N, M) |

Image File
⎫ 18

FIG. 2

Integrating Specularity detector in Segregation Framework

Approach - 1

Figure 3

Approach - 2

Figure 10

SYSTEM AND METHOD FOR DETECTION OF SPECULARITY IN AN IMAGE

BACKGROUND OF THE INVENTION

Specularity in an image refers to the occurrence of a mirror-like specular reflection of light from a material surface depicted in the image. Materials such as glass, metal, human skin and most painted material surfaces are quite glossy and may exhibit prominent specularities when depicted in an image. In the execution of a computer processing technique for the analysis of the image, the occurrence of specularities can interfere with a correct and accurate performance of the executed technique. For example, in an image segregation technique, to segregate intrinsic material and illumination aspects of an image, there is an assumption that the materials depicted in the image are lambertian. However, materials exhibiting specular reflections do not satisfy the lambertian assumption, causing a segregation operation to fail. Accordingly, there is a need for the development of methods for the detection and removal of specular reflections that may appear in a recorded image.

SUMMARY OF THE INVENTION

The present invention provides a system and method for the detection and removal of specularity in an image.

In a first exemplary embodiment of the present invention, an automated, computerized method is provided for processing an image. According to a feature of the present invention, the method comprises the steps of providing an image file depicting an image, in a computer memory, assembling a feature vector for the image file, the feature vector containing information regarding a likelihood that a selected region of the image file is specular, providing a classifier derived from a computer learning technique, computing a classification score for the selected region of the image file, as a function of the feature vector and the classifier and classifying the region as being specular, as a function of the classification score.

In a second exemplary embodiment of the present invention, a computer system is provided. The computer system comprises a CPU and a memory storing an image file containing an image. According to a feature of the present invention, the CPU is arranged and configured to execute a routine to assemble a feature vector for the image file, the feature vector containing information regarding a likelihood that a selected region of the image file is specular, provide a classifier derived from a computer learning technique, compute a classification score for the selected region of the image file, as a function of the feature vector and the classifier and classify the region as being specular, as a function of the classification score.

In a third exemplary embodiment of the present invention, a computer program product is provided. According to a feature of the present invention, the computer program product is disposed on a computer readable media, and the product includes computer executable process steps operable to control a computer to: assemble a feature vector for an image file, the feature vector containing information regarding a likelihood that a selected region of the image file is specular, provide a classifier derived from a computer learning technique, compute a classification score for the selected region of the image file, as a function of the feature vector and the classifier and classify the region as being specular, as a function of the classification score.

In a fourth exemplary embodiment of the present invention, an automated, computerized method is provided for processing an image. According to a feature of the present invention, the method comprises the steps of providing an image file depicting an image, in a computer memory, detecting specularity in the image and segregating the image into intrinsic images with reference to the detected specularity.

In a fifth exemplary embodiment of the present invention, a computer program product is provided. According to a feature of the present invention, the computer program product is disposed on a computer readable media, and the product includes computer executable process steps operable to control a computer to: provide an image file depicting an image, in a computer memory, detect specularity in the image and segregate the image into intrinsic images with reference to the detected specularity.

In a sixth exemplary embodiment of the present invention, an automated, computerized method is provided for processing an image. According to a feature of the present invention, the method comprises the steps of providing an image file depicting an image, in a computer memory, identifying features of the image indicating a likelihood that a selected region of the image file is specular and classifying the region as being specular, as a function of the identified features.

In a seventh exemplary embodiment of the present invention, a computer program product is provided. According to a feature of the present invention, the computer program product is disposed on a computer readable media, and the product includes computer executable process steps operable to control a computer to: provide an image file depicting an image, in a computer memory, identify features of the image indicating a likelihood that a selected region of the image file is specular; and classify the region as being specular, as a function of the identified features.

In accordance with yet further embodiments of the present invention, computer systems are provided, which include one or more computers configured (e.g., programmed) to perform the methods described above. In accordance with other embodiments of the present invention, computer program products, including computer readable media, are provided which have stored thereon computer executable process steps operable to control a computer(s) to implement the embodiments described above. The present invention contemplates a computer readable media as any product that embodies information usable in a computer to execute the methods of the present invention, including instructions implemented as a hardware circuit, for example, as in an integrated circuit chip. The automated, computerized methods can be performed by a digital computer, analog computer, optical sensor, state machine, sequencer, integrated chip or any device or apparatus that can be designed or programed to carry out the steps of the methods of the present invention.

DETAILED DESCRIPTION OF THE PREFERRED EMBODIMENTS

Figure 1:
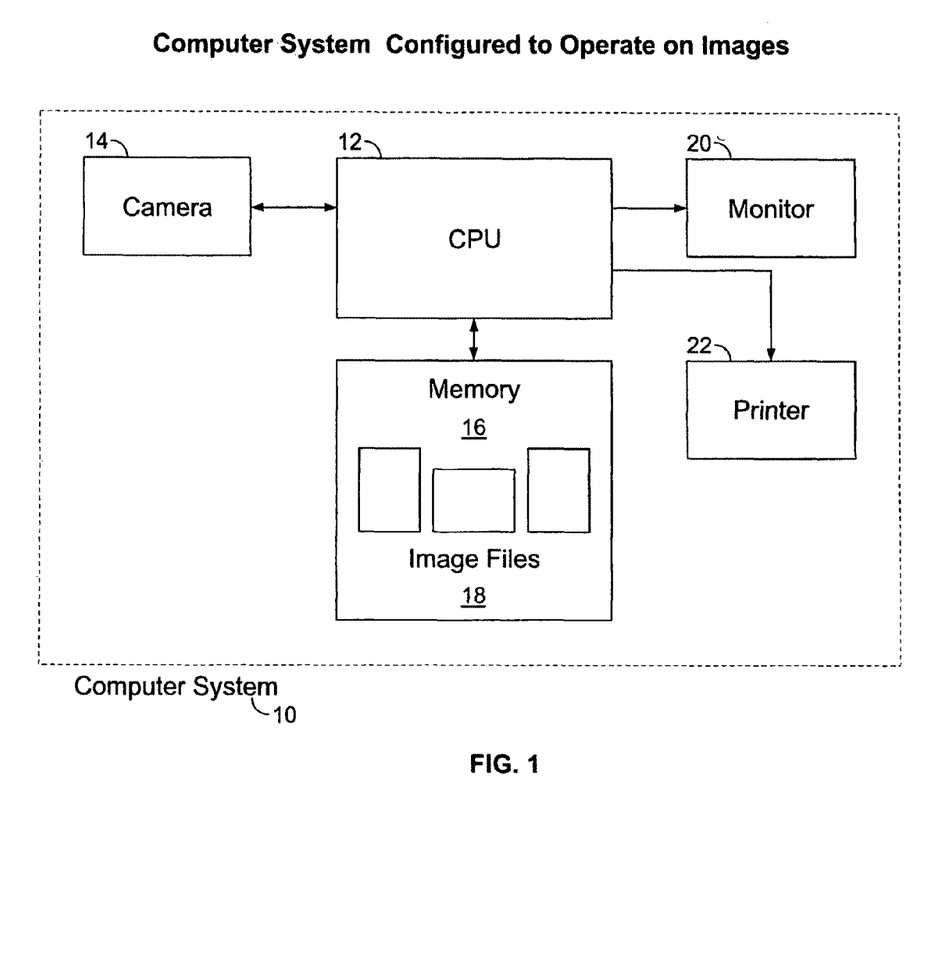
FIG. 1 is a block diagram of a computer system arranged and configured to perform operations related to images.

Referring now to the drawings, and initially to FIG. 1, there is shown a block diagram of a computer system 10 arranged and configured to perform operations related to images. A CPU 12 is coupled to a device such as, for example, a digital camera 14 via, for example, a USB port. The digital camera 14 operates to download images stored locally on the camera 14, to the CPU 12. The CPU 12 stores the downloaded images in a memory 16 as image files 18. The image files 18 can be accessed by the CPU 12 for display on a monitor 20, or for print out on a printer 22.

Alternatively, the CPU 12 can be implemented as a microprocessor embedded in a device such as, for example, the digital camera 14 or a robot. The CPU 12 can also be equipped with a real time operating system for real time operations related to images, in connection with, for example, a robotic operation or an interactive operation with a user.

Figure 2:
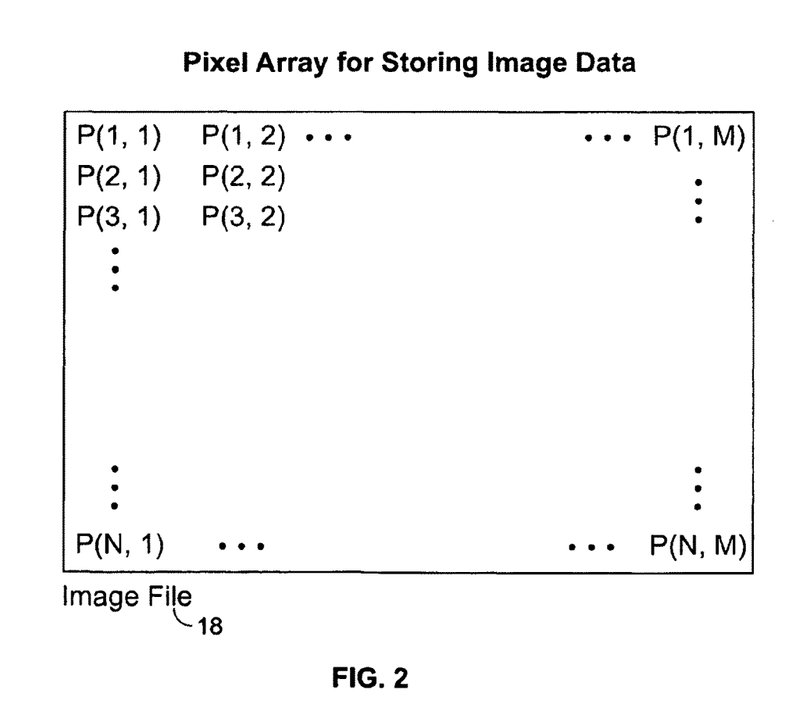
FIG. 2 shows an n×m pixel array image file for an image stored in the computer system of FIG. 1.

As shown in FIG. 2, each image file 18 comprises an n×m pixel array. Each pixel, p, is a picture element corresponding to a discrete portion of the overall image. All of the pixels together define the image represented by the image file 18. Each pixel comprises a digital value corresponding to a set of color bands, for example, red, green and blue color components (RGB) of the picture element. The present invention is applicable to any multi-band image, where each band corresponds to a piece of the electro-magnetic spectrum. The pixel array includes n rows of m columns each, starting with the pixel p (1,1) and ending with the pixel p(n, m). When displaying or printing an image, the CPU 12 retrieves the corresponding image file 18 from the memory 16, and operates the monitor 20 or printer 22, as the case may be, as a function of the digital values of the pixels in the image file 18, as is generally known.

According to a feature of the present invention, in an image process, the CPU 12 operates to analyze and process information, for example, the RGB values of the pixels of an image stored in an image file 18, to achieve various objectives, such as, for example, a correct and accurate identification of illumination and material aspects of the image. The present invention provides a method and system for generation of intrinsic images. The intrinsic images correspond to an original image, for example, an image depicted in an input image file 18. The intrinsic images include, for example, an illumination image, to capture the intensity and color of light incident upon each point on the surfaces depicted in the image, and a material reflectance image, to capture reflectance properties of surfaces depicted in the image (the percentage of each wavelength of light a surface reflects).

A fundamental observation underlying a basic discovery of the present invention, is that an image comprises two components, material and illumination. All changes in an image are caused by one or the other of these components. Spatio-spectral information is information relevant to contiguous pixels of an image depicted in an image file 18, such as spectral relationships among contiguous pixels, in terms of color bands, for example RGB values of the pixels, and the spatial extent of the pixel spectral characteristics relevant to a characteristic of the image, such as, for example, a single material depicted in the image or illumination flux effecting the image. When one of material and illumination is known in an image, the other can be readily deduced.

Figures 3, 4:
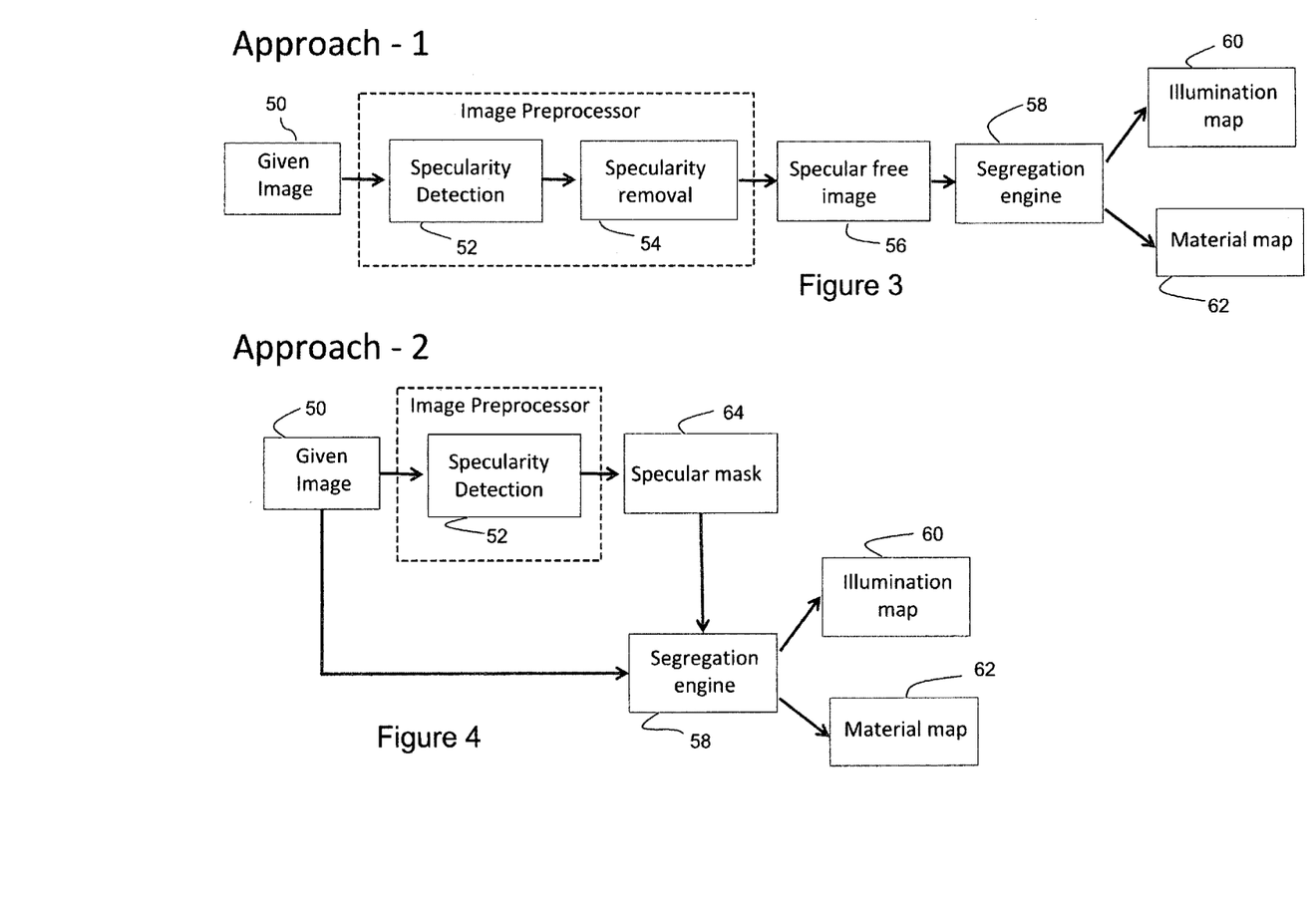
FIG. 3 is a flow chart for performing an image segregation operation, according to a feature of the present invention.
FIG. 4 is a flow chart for performing an alternative approach to an image segregation, according to a feature of the present invention.

Referring now to FIG. 3 there is shown a flow chart for performing an image segregation operation, according to a feature of the present invention. An input image file 18 is input to the CPU 12, operating as an image processor (step 50). The CPU 12 performs each of a specularity detection process 52 and a specularity removal process 54, to output a specular-free image 56. The specular-free image 56 is then input to the CPU 12, now operating as a segregation engine 58, to generate intrinsic images corresponding to the input image, for example, each of an illumination map 60 and a material map 62. The illumination map 60 comprises an intrinsic illumination image corresponding to the original input image file 18, to capture the intensity and color of light incident upon each point on the surfaces depicted in the image. The material map 62 comprises an intrinsic material reflectance image corresponding to the original input image file 18, to capture reflectance properties of surfaces depicted in the image (the percentage of each wavelength of light a surface reflects). The input of a specular-free image assures a more accurate and correct performance of the image segregation.

FIG. 4 shows a flow chart for performing an alternative approach to an image segregation, according to a feature of the present invention. In this exemplary embodiment of the present invention, the input image file 50 is input to the CPU 12, operating both as an image processor (for specularity detection 52) and as a segregation engine 58. The specularity detection process 52 outputs a specular mask 64, which identifies all pixels of the image file 18 exhibiting specular reflection. The specular mask 64 is also input to the segregation engine 58. The segregation engine 58 generates the illumination map 60 and the material map 62 with reference to the specular mask 64. The pixel information on specularities contained in the specular mask 64 is either treated as a noise factor in the segregation processing or is handled as a component of the illumination aspects of the image in the generation of the illumination map. In the alternative embodiment of FIG. 4, only detection of specularities is performed, reducing the computational overhead of the overall process.

Figure 5:
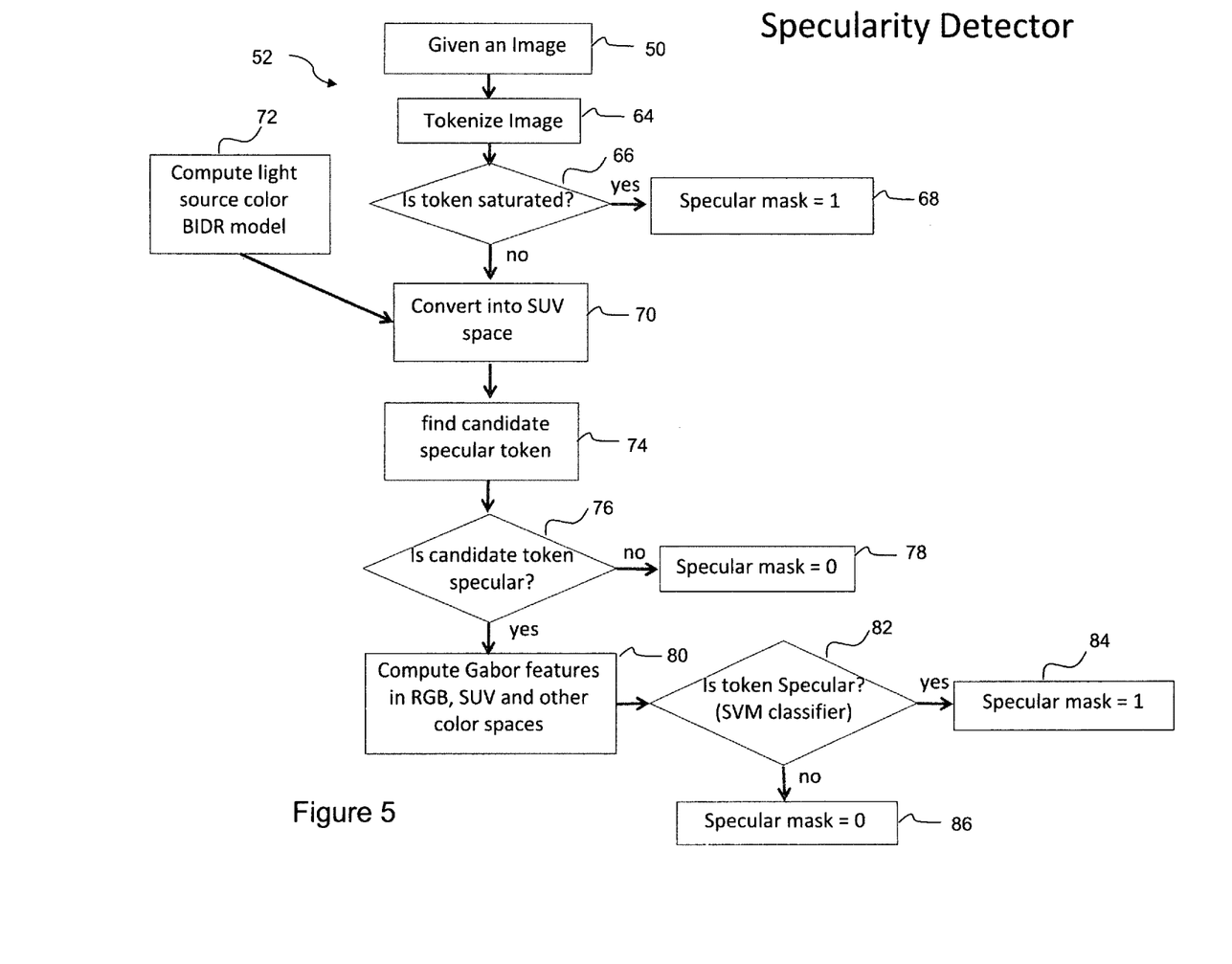
FIG. 5 is a flow chart for detecting specularity in a image, according to a feature of the present invention.

FIG. 5 shows a flow chart for detecting specularity in a image (step 52 in FIGS. 3 and 4), according to a feature of the present invention. The input image 50 is processed by the CPU 12 to identify regions in the image, for example, to identify tokens in the image (step 64). A token can comprise, for example, a uniform, homogeneous Type C token, which comprises an image region having a single robust color measurement among contiguous pixels of the region. For example, all of the pixels of a Type C token have colors within the noise level of the device used to record the image, such as the digital camera 14.

A seed test can be utilized by the CPU 12 to identify Type C tokens in an image file 18. The CPU 12 selects a first pixel, I=(1, 1) for example, the pixel at the upper left corner of a first N×N sample of the image file 18 (see FIG. 2). The pixel is then tested to determine if the selected pixel is part of a good seed. The test can comprise a comparison of the color value of the selected pixel to the color values of a preselected number of its neighboring pixels as the seed, for example, the N×N array. The color value comparison can be with respect to multiple color band values (RGB in our example) of the pixel, relative to the noise level of the digital camera 14.

When a good seed is found, the CPU 12 proceeds to examine pixels contiguous to the seed, to build out a token. The CPU 12 marks each identified token with a unique label, and lists for the token each pixel forming the token. For a more detailed description of token identification, reference is made to U. S. Patent Application Publication No. 2009/0034835, published on Feb. 5, 2009.

Tokens are used to improve the computational efficiency of the process by analyzing groups of pixels having a single robust color measurement, that is analyzing a representation of all of the constituent pixels of a token at one time. The CPU 12 analyzes each token identified in step 64, one at a time, in respect of properties or characteristics of specularity. The characteristics include:

specularaties are typically much brighter than surrounding regions of the image;

specularaties posses the color of the illuminating source;

specularaties have characteristic shapes, for example, circular spots for spherical objects and linear spots for cylindrically shaped objects brightness at a region of specular pixels, falls abruptly, from illumination color to material color specular regions show a T shaped color distribution when analyzed in a color space, at a local region.

Each token is represented by the average color value for the recorded color values of the constituent pixels of the token. The CPU 12 also provides the specular mask 64, corresponding to the input image file 18, wherein an indication location is provided for each identified token. Each identification location will be set at an indication of 1 or 0, 1 representing an indication that the respective token is specular, and 0 representing an indication that the token is not specular.

Initially, in step 66, the CPU 12 determines if a selected token is saturated. Saturation refers to color values for bands of a color space that are close to a maximum value possible for the color band. For example, in RGB space, with an 8 bit indication of color value, if any of the Red, Green or Blue bands has a value close to 255, the corresponding token is considered to be saturated. In step 66, if the token under consideration is saturated, then the indication location for the token in the specular mask 64 is set at 1 (68). If the token under consideration is not saturated, the CPU 12 proceeds to step 70.

In step 70, the CPU 12 converts the color representing the token under consideration into an SUV color space value. SUV space is a source dependent color space wherein the axes of an RGB coordinate system are rotated such that one of the axes (for example, the red axis) is aligned with RGB source vector s. The SUV space separates specular and diffuse reflection effects from one another. In this manner, the S channel of the SUV space encodes the entire specular component and an unknown portion of the diffuse component. The UV channels are specular invariant. For a more detailed description of an SUV space, reference is made to "Color Subspaces as Photometric Invariants," Todd Zickler et al., International Journal of Computer Vision, 79(1): 13-30, August 2008 (hereinafter the Zickler et al. Reference).

As described in the Zickler et al. reference, the color of the source illumination is determined to implement the conversion into SUV space. In general, light source colors tend to be neutral or close to white. If an image is white balanced, the illumination source color can be assumed to be white. Otherwise, according to a feature of the present invention, in step 72, a bi-illuminant dichromatic reflection model (BIDR model), can be used to calculate the illumination source color.

The BIDR model predicts that when a color change is due to an illumination change (i.e. an increase in the intensity of the incident illuminant in the interplay between the incident or direct illuminant and the ambient illuminant, in the illumination field) over a single material, from full shadow to fully lit, a line is defined in RGB space, depicting the color variations for a pixel, from full shadow to fully lit, as a function of the percentage of incident illuminant in the illumination field.

For purposes of describing, identifying and using the model, the BIDR model can be stated as: $I(x, y, z, \theta, \phi, \lambda) = c_b(\lambda) l_d(\lambda) \gamma_b + M_a(\lambda) c_b(\lambda)$, where: $I(x, y, z, \theta, \phi, \lambda)$ is the radiance of a surface point at $(x, y, z)$ in the direction $\theta, \phi$ for the wavelength $\lambda$, $c_b(\lambda)$ is the geometry independent body reflectance of a surface for the wavelength $\lambda$, $l_d(\lambda)$ is the incident illuminant for the wavelength $\lambda$. $\gamma_b$ is the product of a shadow factor $s_{x, y, z}$ and a geometric factor $m_b(\theta_i)$, and $M_a(\lambda)$ is the integral of the ambient illuminant and geometric body reflectance over a hemisphere, excluding the incident illuminant. For more detailed information on the BIDR model, reference should be made to US Patent Application Publication No. 2007/0176940, published on Aug. 2, 2007, and "A Bi-illuminant Dichromatic Reflection Model for Understanding Images," CVPR08 (1-8) (2008).

In step 72, in the event the image is not white balanced, the CPU 12 generates a plot according to the BIDR model, in log RGB space, to determine the illumination color value for use in the SUV conversion of step 70, as described in sections 3 and 4 of "A Bi-illuminant Dichromatic Reflection Model for Understanding Images," CVPR08 (1-8) (2008).

In step 74, the SUV values for the token under consideration, as determined in step 70, are evaluated by the CPU 12, to determine whether the token is a candidate for classification as a specular token. To that end, the ratio of $s/(\sqrt{u^2+v^2})$ is calculated. If the ratio has a value such that ($s \gg \sqrt{u^2+v^2}$) there is a high likelihood that the token under consideration is specular. Moreover, the value of $\sqrt{u^2+v^2}$ is compared to a threshold value, for example, the value of $\sqrt{u^2+v^2}$ is not lower than, for example, 0.01 to 0.005. A value lower than the threshold is an indication that the material color of the token under consideration may be similar to the illumination color value, and is most likely not a specular token.

Thus, in step 74 the CPU 12 evaluates the conditions ($s \gg \sqrt{u^2+v^2}$) and $\sqrt{u^2+v^2}$ is not lower than, for example, 0.01 to 0.005. If both conditions are met, the CPU 12 designates the token under consideration as a candidate for being classified as a specular token. If either of the conditions are not met, the CPU 12 designates the token under consideration as not being a candidate.

In decision block 76, if a token under consideration is not a candidate, the CPU 12 sets the indication in the specular mask for the token under consideration to 0 (step 78). If the token is a candidate, the CPU 12 proceeds to step 80.

In step 80, the CPU 12 begins a more extensive analysis of the token under consideration to substantiate the status of the token as a specular token. In the further analysis, the CPU 12 evaluates cues relevant to specularity. The cues are based upon the various properties or characteristics exhibited by specular pixels, as described in detail above. The cues can be represented, for example, by features computed by the CPU 12 by application of Gabor filters to pixels of a token under consideration, in each of several different color spaces, for example, in each of RGB, SUV, HSV, color opponent space and log RGB value color spaces. The Gabor filters can be in each of several different orientations and wavelengths, such as, for example, orientations of 0, 45, 90 and 135 degrees and wavelengths of 6 pixels and 4 pixels, respectively. The Gabor features, relevant to each of the different color spaces, for a token under consideration, are concatenated in a feature vector that is input to a known computer learning operation such as, for example, a Support Vector Machine (SVM) technique (step 82).

In the SVM technique of step 82, an SVM classifier is applied to an input feature vector representing a candidate token, for classification as a specular token. The classifier is a process or algorithm that takes an input feature vector extracted from the candidate token and outputs a prediction or classification regarding a likelihood that the candidate token is a specular token. The classification can be expressed as a score. The score can be in the range of from 0 to 1, a 0 corresponding to no likelihood that the candidate token is specular and a 1 corresponding to a high likelihood that the candidate token is specular.

Figure 6:
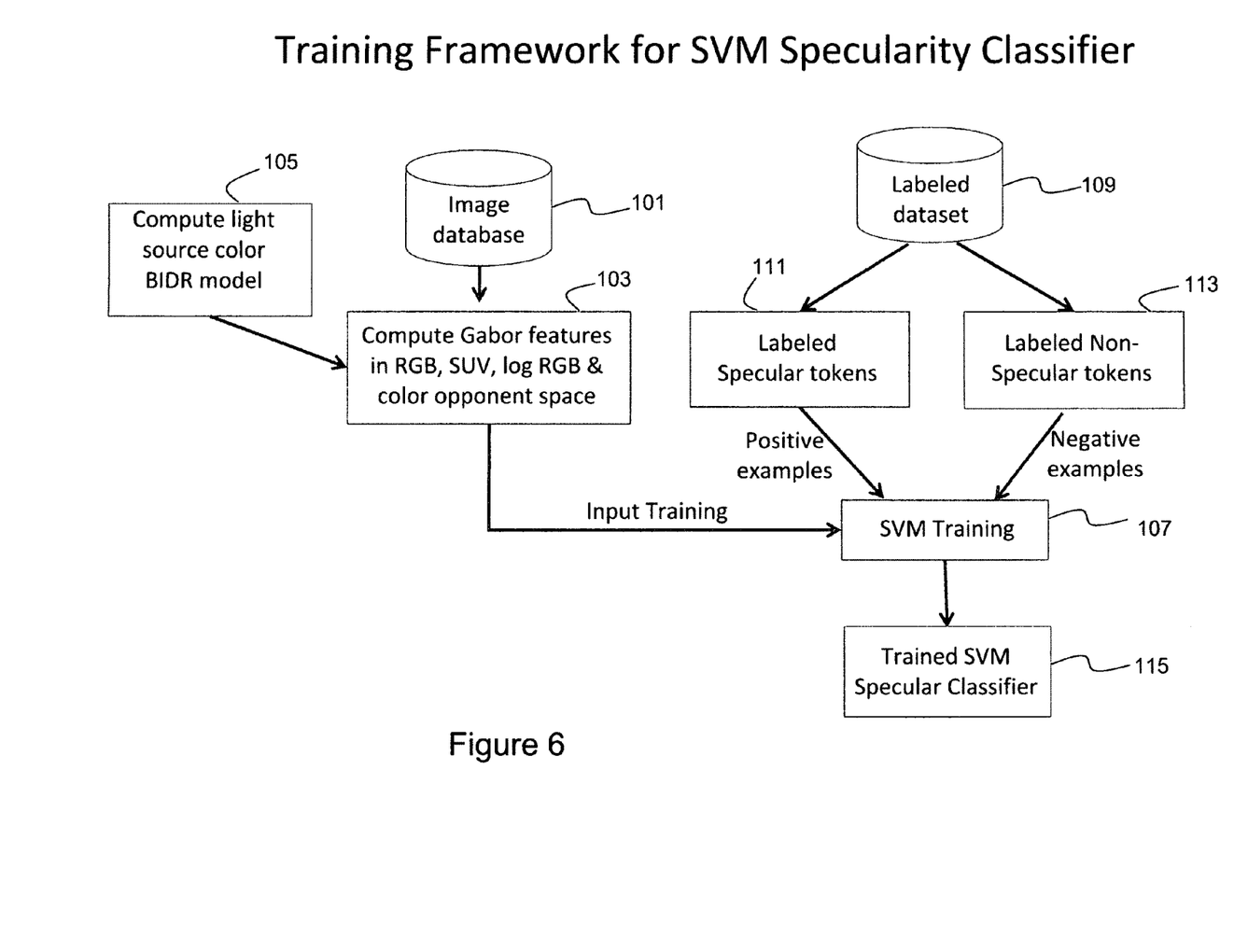
FIG. 6 is a flow chart for training a specularity classifier, according to a feature of the present invention.

Referring now to FIG. 6, there is shown a flow chart for training a specularity classifier, such as an SVM classifier, according to a feature of the present invention. A computer learning technique, such as the SVM approach, typically includes the step of providing a training set, with the training set comprising a series of sample images selected from an image database. For each of the images of the training set, local image features are identified to provide representations of, for example, features of interest and relevant, in our example, to specularity characteristics and properties. Parameters based upon the features, from each of the images of the image database, are arranged in feature vectors for use in training.

In a learning technique, a classifier is trained from the training set, for use in the learning technique, to, for example, classify regions of an input image as having specularity. As noted above, a classifier in our exemplary embodiment of the present invention, is trained to be a process or algorithm that takes a feature vector extracted from an input candidate token and outputs a prediction or classification score regarding the likelihood that the candidate token is a specular token.

To that end, in step 101 of FIG. 6, an image database is provided. The image database includes sample images with specularity, for positive examples, and sample images without specularity, as negative examples, as is generally known in the computer learning art. In step 103, each image of the image database is processed by the CPU 12 in the same manner as the candidate token, as described above, that is, the CPU 12 computes Gabor features for each image in each of RGB, SUV, HSV, color opponent space and log RGB value color spaces. The Gabor features for each image are concatenated to provide a feature vector corresponding to each image of the image database.

For conversion of an image to an SUV color space, the CPU 12 utilizes BIDR model information, as described above, to determine the illumination color value for a respective image of the image database (step 105). If the images of the image database are white balanced, the illumination color is assumed to be white. The resulting feature vectors derived from the image database are input as input training to an SVM training engine 107.

According to a further feature of the present invention, each image (or a subset of the images) of the image database (labeled data set 109) is manually coded to indicate regions of specularity in the image depicted in the respective image of the database (for explicit positive examples) (data subset 111) and samples of regions with non-specular properties (for explicit negative examples) (data subset 113). In an exemplary embodiment of the present invention, the coding is a color coding wherein a human operator views each image of the labeled data set 109, and in a touch screen, brush stroke operation, marks off each region of specularity (for the positive examples) or of non-specular properties (for negative examples), and controls the computer to assign an arbitrary color to each marked region. All of the labeled images are input to the SVM training engine 107.

Upon input of all of the training images, the SVM classifier is trained as per the known Support Vector Machine technique. The output of the SVM Training engine is an SVM classifier (step 115).

Referring once again to FIG. 5, in step 82, the CPU 12 applies the SVM classifier (output 115 of FIG. 6), to the feature vector for an input candidate token. The SVM classifier generates a score for the candidate token, of from 0 to 1, as described above. The CPU 12 can evaluate the score in relation to a threshold value, for example, 0.8. If the score for the candidate token is 0.8 or more, the indication for the candidate token in the specular mask is set at 1 (step 84). If the score for the candidate token is less than 0.8, the indication for the candidate token in the specular mask is set at 0 (step 86).

According to a feature of the present invention, steps 66 to 86 of FIG. 5 are performed for each token identified in step 64 of the process of FIG. 5, to generate a complete specular mask for the given image 50.

Figure 7:
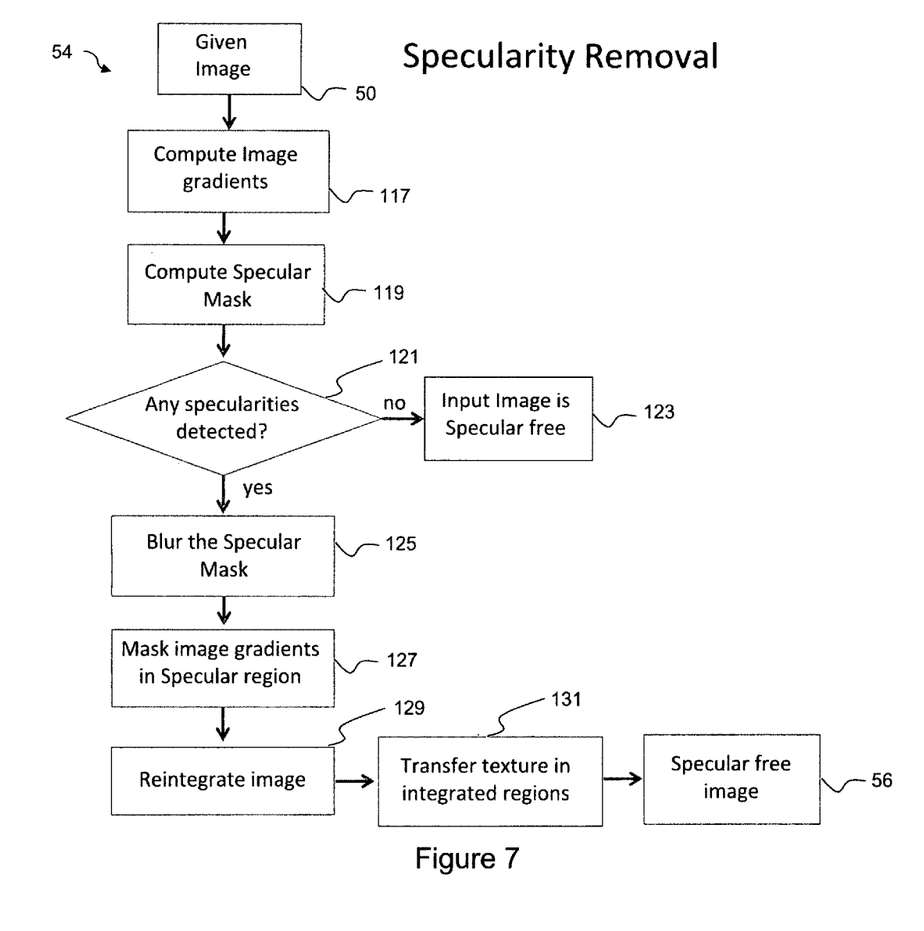
FIG. 7 is a flow chart for removing specularity from an image, according to a feature of the present invention.

FIG. 7 is a flow chart for removing specularity from an image, according to a feature of the present invention (step 54 in FIG. 3). In the method for removing specularities, the input image 50 is processed by the CPU 12 in a calculation of image gradients (step 117). Gradients are often utilized to provide a more suitable representation of an image for purposes of computer processing. A gradient is a measure of the magnitude and direction of color and/or color intensity change within an image, as for example, across edges caused by features of objects depicted in the image. Any known method can be implemented to calculate the image gradients, as for example, convolution of pixels using a Sobel filter.

In step 119, the CPU 12 computes a specular mask for the input image as per the routine of FIG. 5, as described above. In the decision block of step 121, the CPU 12 examines the specular mask to determine if any of the tokens of the input image have been designated by a 1, indicating a specular token. If no, the CPU 12 can exit the specularity removal routine (step 123).

If yes, the CPU 12 proceeds to step 125. In step 125, the CPU 12 blurs those regions of the image corresponding to specular tokens, as indicated in the specular mask. The blurring can be a Gaussian blur.

In step 127, the CPU 12 modifies the gradients of all pixels within specular tokens, as specified in the specular mask, to remove specular characteristics. For example, each specular gradient is set to zero. In step 129, the CPU 12 reintegrates the gradient representation of the image, with the modified versions of the gradients for pixels in the specular tokens, to regenerate the original image, however, now without specularities, due to the modified specular gradients. The reintegration can be performed utilizing any well known image reintegration technique, such as, for example, a Poisson solver with Neumann boundary conditions.

Due to the masking and modification of specular gradients, the modified specular regions of the original image will appear flat and without any texture in the reintegrated image. Accordingly, in step 131, the CPU 12 operates to restore texture to those regions of the image that have been modified to eliminate specularities. The restoration is achieved utilizing information from the UV channels of the SUV color space representations of the image. To that end, the ratio of the UV magnitude of the original image to the UV magnitude in the modified, reintegrated image, is used to modulate the intensity of the former specular regions of the reintegrated image, to thereby restore a textured appearance.

Upon completion of step 131, the CPU 12 outputs a specular free image 56.

Figure 8:
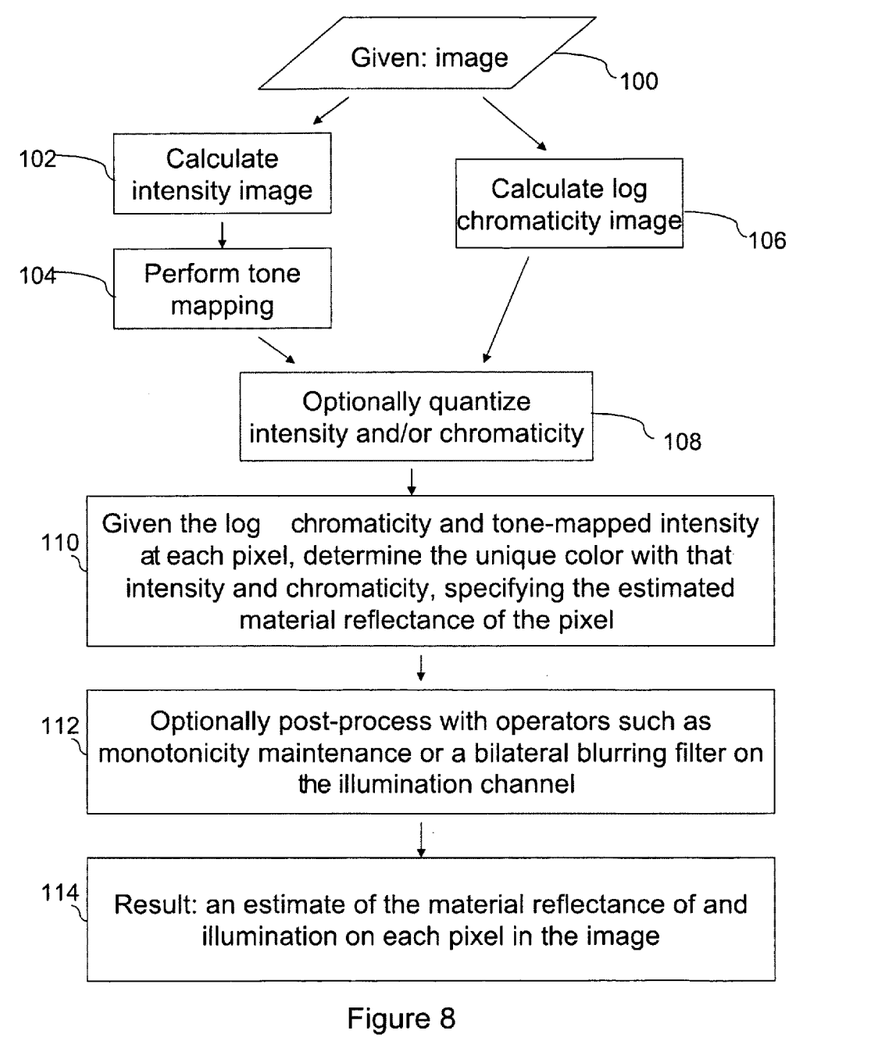
FIG. 8 is a flow chart for estimating material reflectance and illumination aspects of an image depicted in an image file, according to a feature of the present invention.

Referring once again to FIGS. 3 and 4, either the specular free image 56 (the example of FIG. 3) or the given image 50 (together with the specular mask 64) (the example of FIG. 4) is input to the segregation engine 58, as the case may be. FIG. 8 is a flow chart for estimating material reflectance and illumination aspects of an image depicted in an image file 18 (either as processed as the specular free image 56, or comprising the given image 50, with reference to the specular mask 64), to implement the segregation engine 58 of FIGS. 3 and 4, for generation of the illumination map 60 and the material map 62, according to a feature of the present invention.

Referring now to FIG. 8, in step 100, the input image file 18 is given to the CPU 12. Upon input of an image file 18, the CPU 12 executes, independently, either serially, or in parallel, operations for performing each of a tone mapping (steps 102 and 104) and a calculation of log chromaticity values (step 106) for the image depicted in the input image file 18, as will appear. In the event the input is the given image 50, and the specular mask 64, the CPU 12 treats all pixels in tokens designated as specular in the specular mask 64, as noise, for example, each such specular pixel is set to zero or ignored in processing, or assigns the pixel color values for the specular tokens to the illumination map.

Tone mapping is a technique for preserving local variation within an image, while reducing global variation. Specific known methods for performing tone mapping on an image are described in "Fast Bilateral Filtering for the Display of High-Dynamic-Range Images," Frédo Durand and Julie Dorsey, ACM Transactions of Graphics (Proceedings of the ACM SIGGRAPH '02 Conference), and "A Fast Approximation of the Bilateral Filter using a Signal Processing Approach," Sylvain Paris and Frédo Durand, European Conference on Computer Vision (ECCV '06).

Performance of the technique separates an image into a "level" channel and a "detail" channel. The level channel depicts large scale variations of the image, without details, which are depicted in the detail channel. As such, the level channel is a reasonable approximation of log illumination intensity of the image, and the detail channel is a reasonable approximation of the log material intensity. The output of a standard tone mapping technique is an intensity specification for each pixel of the image, such as, for example, a pixel p(n,m, R, G, B) is specified by the value (R+G+B)/3.

According to a feature of the present invention, a standard tone mapping technique is modified in a manner to accommodate the objective of segregating illumination and material aspects of an image from one another. In a standard tone mapping operation, the dynamic range of the level channel is reduced and then recombined with the detailed channel to provide a reduction in global contrast while preserving local contrast. In an exemplary implementation of the present invention, the tone mapping is used in a manner that attempts to remove global variation rather than just reduce global variation, to segregate out an illumination invariant material aspect of the image.

A formula for implementing a reconstruction of an intensity image with a reduction of the dynamic range of the level channel, can be expressed in terms of a simple linear transform. For example, let max=the maximum value in the level channel, min=the minimum value in the level channel, and $\delta$ represents a desired contrast (max−min). Then a dynamic range reduction can be performed by multiplying each value in the level channel by log ($\delta$)/(max−min). A typical value for $\delta$, in a standard application of tone mapping, is 40, which corresponds to the dynamic range of print media, wherein black ink is 40 times darker than white paper.

Thus, a standard reconstruction for an intensity image I, can be expressed by:

$$I = \exp(1*\log(40)/(\max-\min)+1*d)$$

wherein l is the level channel and d is the detail channel

According to a feature of the present invention, the desired contrast (in an attempt to eliminate the effects of illumination) is set at 1 or lower, for example, 0.85. Thus, pursuant to an exemplary embodiment of the present invention, a reconstruction to provide a material intensity image (M) is expressed by:

$$M = \exp(1*\log(0.85)/(\max-\min)+1.2*d)$$

As indicated in the above formula for M, the local contrast of the detail channel d is also modified by multiplying the detail channel by 1.2. Thus, according to a feature of the present invention, a unique material intensity based value can be determined for each pixel of an image by modifying a tone mapping technique toward an attempt to eliminate the effects of illumination, as described above.

Log chromaticity is a technique for developing a two dimensional illumination invariant chromaticity space. A method and system for separating illumination and reflectance using a log chromaticity space is disclosed in U. S. Patent Application Publication No. 2007/0242878, published on Oct. 18, 2007. Log chromaticity representation values provide illumination invariant values for pixels of the image. Logarithmic values of the color band values of the image pixels are plotted on a log-color space graph. The logarithmic values are then projected to a log-chromaticity projection plane oriented as a function of the BIDR model. As noted above, the BIDR Model predicts that differing color measurement values fall generally along a line in RGB space, from a dark end (in shadow) to a bright end (lit end), along a positive slope, when the color change is due to an illumination change forming a shadow over a single material of a scene depicted in the image.

Thus, RGB values of a material color, from full light to full shadow, vary generally along a gentle one dimensional curve in RGB space. For more detailed information on the BIDR model, reference should be made to U. S. Patent Application No. US 2007/0176940, published on Aug. 2, 2007.

A measured color C of a pixel, according to the BIDR model, can be expressed as: $C_\lambda = (A_\lambda + \gamma D_\lambda) M_\lambda$, where A is the ambient illumination, D is the direct or incident illumination, $\gamma$ is a scalar from 0 to 1, representing the fraction of the direct illumination, D, falling upon the point in the image represented by the respective pixel, M is the material reflectance of the surface and $\lambda$ the wavelength or color band, such as red, green or blue.

In log space, the equation is stated as: $\log C_\lambda = \log (A_\lambda + \gamma D_\lambda) + \log M_\lambda$ If a measurement is taken of color value a two locations on the same material $(C_{1,\lambda}, C_{2,\lambda})$, one in full light (for $C_{1,\lambda}, \gamma=1$), and the other in full shadow (for $C_{2,\lambda}, \gamma=0$), the difference in color values is stated by: $\log C_{1,\lambda} - \log C_{2,\lambda} = \log (A_\lambda + D_\lambda) - \log A_\lambda$.

It should be noted that the difference equation is independent of material reflectance. Accordingly, in a log RGB color space, the orientation of the positive slope is the same for the BIDR cylinders for all materials depicted in the image. Thus, projections of the BIDR cylinders onto a plane perpendicular to the common orientation can be utilized to provide an unique, illumination invariant value (based upon chromaticity) for each pixel of an image.

Figure 9:
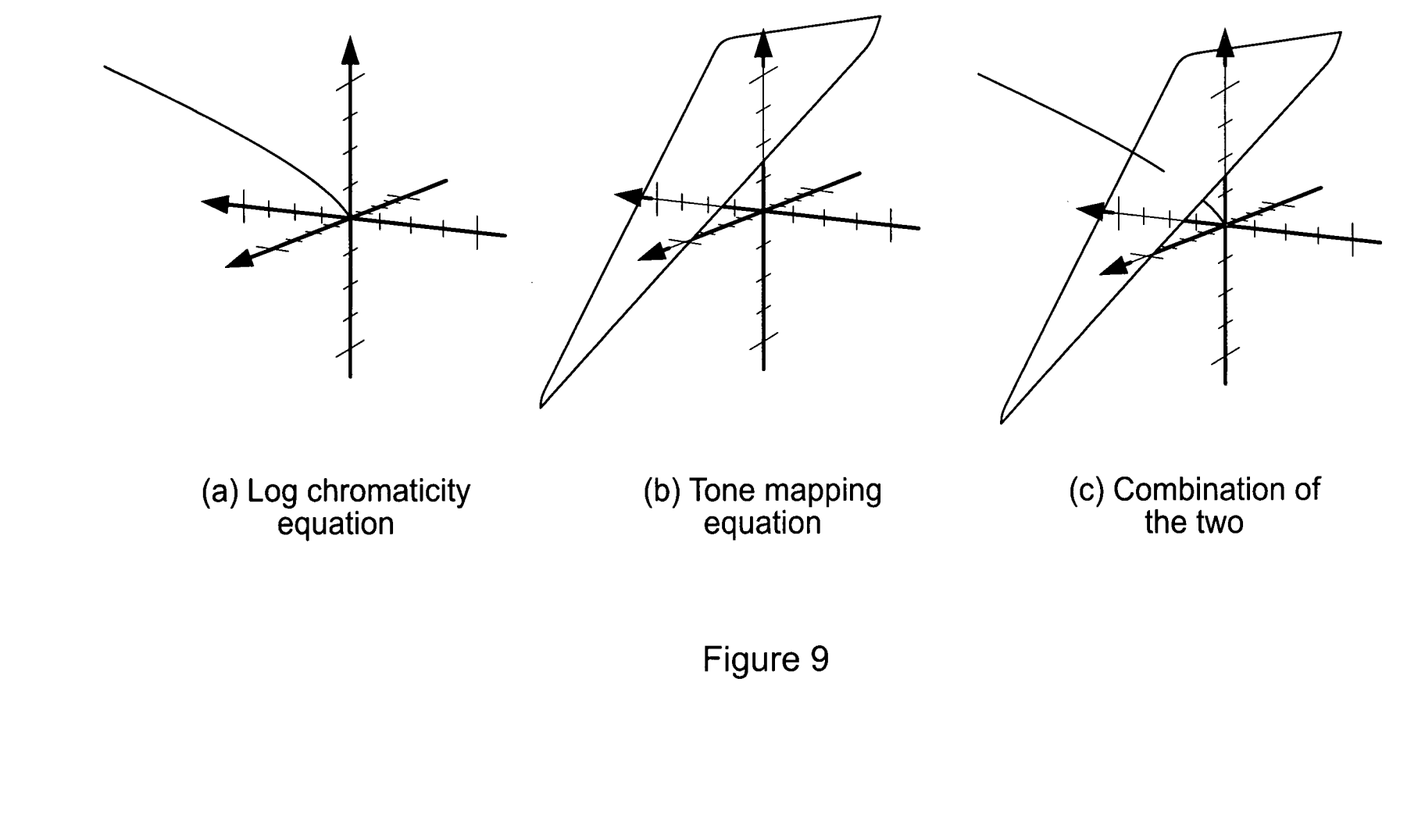
FIG. 9 depicts graphic illustrations of (a) a log chromaticity equation, (b) a tone mapping equation and (c) a combination of the previous two equations.

According to a feature of the present invention, a unique, illumination invariant material color for each pixel can be determined as a function of a combination of tone mapping and log chromaticity information relevant to the pixel. As shown in FIG. 9(a), a plot of the log chromaticity equation defines, for a particular material, a gently curving, one dimensional line in, for example, an RGB space, corresponding to the varying colors of the material, from full light, to full shadow. Tone mapping for a pixel specifies a particular intensity for the pixel, but not a specific color. As shown in FIG. 9(b), this property of tone mapping defines a two dimensional plane in RGB space. There is exactly one color value that satisfies both the log chromaticity and tone mapping intensity equations (see FIG. 9(c)).

Log chromaticity can be expressed by the following equation:

$$\log M_\lambda = \log C_\lambda + \gamma \log N_\lambda,$$

where M is the material color, C is the measured image color, as stored in an image file 18, N is the normal to the log chromaticity plane (corresponding to the common orientation of the BIDR cylinders in log RGB space), and γ is the unknown factor parameterizing the log chromaticity line in log RGB space.

In linear space, the log chromaticity equation becomes:

$$M_\lambda = \exp(\log C_\lambda + \gamma \log N_\lambda).$$

In RGB space, the equation defines the one dimensional curve depicted in FIG. 4(a), that specifies all the varying colors for the material represented by a respective pixel, from fully lit to full shadow.

As noted above, tone mapping specifies a particular intensity for each pixel. The intensity can be measured in many ways. For example:

$$I = (R+G+B)/3.$$

A formula such as the above stated intensity equation is a single-valued function that specifies a two dimensional manifold, such as the plane illustrated in FIG. 9(b). To the extent that illumination variation is large relative to material variation (i.e. shadows are sufficiently deep such that shadowed bright materials are significantly darker than lit dark materials) tone mapping provides a reasonable estimate of the intensity of material reflectance at each pixel in an image. Thus, the two dimensional manifold represents a range of colors that includes a full-lit version of the material represented by a pixel.

According to a feature of the present invention, the one color value in RGB space that is both on the log chromaticity line and in the tone mapping intensity plane, for a pixel (see FIG. 9(c)) is taken as the material color for that pixel. The one color value that satisfies both the log chromaticity and tone mapping equations can be determined by constraining a pixel color value for a pixel $P_0$, to the requirements of both equations.

In the simplest case, where I=(R+G+B)/3, the following equations specify an intensity for a color value for $P_0$ that satisfies both of the log chromaticity and tone mapping equations:

$$M_{red} = \exp(\log(C_{red}) + \gamma \log(N_{red}))$$

$$M_{green} = \exp(\log(C_{green}) + \gamma \log(N_{green}))$$

$$M_{blue} = \exp(\log(C_{blue}) + \gamma \log(N_{blue}))$$

where Intensity (M)=V (the actual value returned by execution of the tone mapping), the C values are the known measured values for the pixel $P_0$, as stored in an image file 18, N is the normal to the log chromaticity plane, as determined via execution of the methods taught in the above cited U. S. Patent Application Publication No. 2007/0242878, and γ is to be found, set at a value such that the following condition is met:

$$((\exp(\log(C_{red}) + \gamma \log(N_{red}))) + (\exp(\log(C_{green}) + \gamma \log(N_{green}))) + (\exp(\log(C_{blue}) + \gamma \log(N_{blue}))))/3 - V = 0$$

An approximate solution for a value of γ that satisfies the above condition can be determined using a standard root-finding method, such as Newton's method. When an approximate solution for γ has been determined, the determined value is plugged into the above equations to solve for $M_{red}$, $M_{green}$, and $M_{blue}$ to thereby provide a material reflectance value for the pixel $P_0$.

Referring once again to FIG. 8, in step 102, the CPU 12 operates to calculate an intensity value for each pixel of the input image file 18. In step 104, the CPU 12 executes a standard tone mapping operation, modified as described above, toward an attempt to eliminate the effects of illumination. Thus, through execution of steps 102 and 104, the CPU 12 determines a V value for each pixel of the input image file 18.

In a separate operation, performed serially or in parallel to steps 102 and 104, the CPU 12 executes step 106, to calculate a log chromaticity image. In this manner, the CPU 12 can determine a value for N, for the input image file 18. The CPU 12 can also determine a log chromaticity value for each pixel of the input image file 18, that corresponds to a location on a log chromaticity plane, as taught in U. S. Patent Application Publication No. 2007/0242878.

Optionally, in step 108, the CPU 12 operates to quantize the tone mapping intensity and/or log chromaticity values for improved operating results. Initially, the CPU 12 clusters the log chromaticity values of the pixels, as determined by the CPU 12 in step 106. This can be performed by any known, standard clustering method, such as lead-follower clustering. Then within each chromaticity cluster, the CPU 12 clusters the tone mapping intensity values. For each pixel within a chromaticity cluster, the CPU 12 checks to determine which tone mapping intensity cluster the pixel is in, and then sets the intensity value for the pixel to the mean intensity value for the respective cluster. Quantizing the intensity in this manner reduces the influence of slow intensity change in an image, often due to shading, which can remain in the tone-mapped output.

Log chromaticity values can be subject to a quantizing by setting the log chromaticity value for each pixel to the mean of a respective cluster.

In step 110, for each pixel in the input image file 18, the CPU 12 utilizes the determined values of V and N to solve for γ, and then, with the solved value for γ, solves the $M_{red}$, $M_{green}$, and $M_{blue}$ equations with the determined values of γ, V and N, to provide an estimated material reflectance value for each pixel. This provides an intrinsic material image corresponding to the image depicted in the input image file 18. For an illumination image, the CPU 12 can execute the formula I=ML, where I is the image color, as recorded and stored in the respective image file 18, M the material component of the recorded image color, as solved for with the $M_{red}$, $M_{green}$, and $M_{blue}$ equations and L the illumination component of the recorded image color, to be solved for in the equation.

In step 112, the CPU 12 optionally performs post-processing, such as, for example, monotonicity maintenance and the use of a bilateral blurring filter on the illumination image. Tone mapping can be prone to certain types of errors, particularly "halo effects." Halo effects occur next to edges of high contrast. Close to the edge, the bright region becomes even brighter, and the dark region becomes even darker. Monotonicity maintenance can aid in the removal of the halo effects.

A monotonic linear transition in an image relates to blend pixels. Blend pixels are pixels between two differently colored regions of an image. If the colors between the two regions are plotted in RGB space, there is a linear transition between the colors, with each blend pixel, moving from one region to the next, being a weighted average of the colors of the two regions.

As one moves in color space, from a first region to a second region, the weighted average of the colors of the blend pixels transition linearly, from a weighted average weighted in favor of the color of the first region to a weighted average weighted in favor of the color of the second region. The two regions can be regions of differently colored materials, or a region of a single material with a transition from lit to shadowed regions of the single material. In the performance of the method of the present invention, monotonic linear transitions can be distorted in the generated intrinsic images, such as the halo effect.

Figure 10:
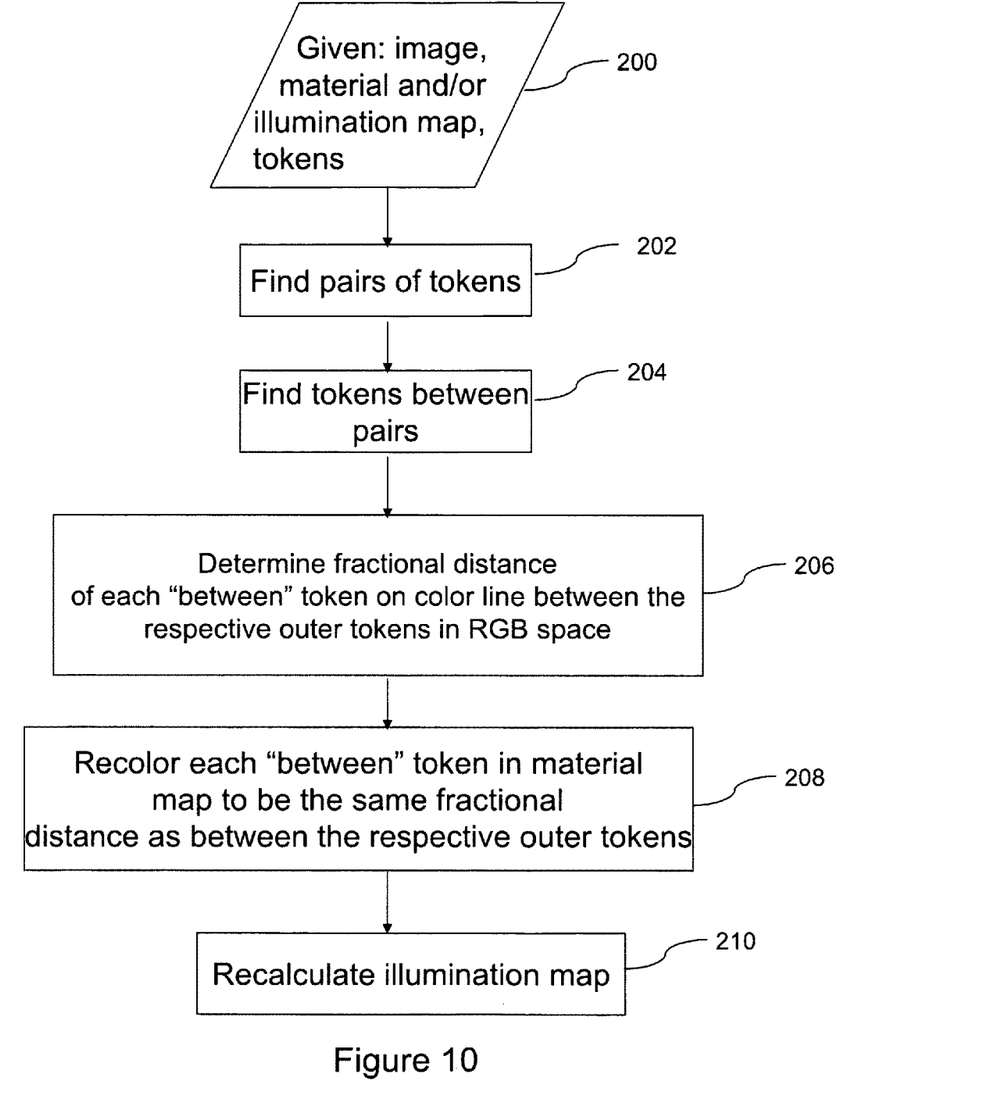
FIG. 10 is a flow chart for performing monotonicity maintenance in an image.

Referring now to FIG. 10, there is shown a flow chart for performing monotonicity maintenance in an image. In step 200, the CPU 12 is provide with the original input image file 18, and intrinsic material and illumination images corresponding to the image file 18, for example, as generated through performance of the routine of FIG. 8. The CPU 12 identifies tokens in the input image file 18, as described above.

In step 202, the CPU 12 identifies pairs of tokens, each pair exhibiting certain properties, for example:
1. The two tokens of the pair are within a preselected distance d, (for example, d=15 pixels), of each other within the image space.
2. The two tokens have a minimum seed size $s_1$, (for example, $s_1$=2).
3. The two tokens have at least $p_1$ pixels each,(for example, $p_1$=20).
4. The two tokens have a color relationship such that one is brighter than the other in all color bands.
5. The two tokens have a color relationship such that the two colors are sufficiently different from one another.

In step 204, the CPU 12 identifies, for each token pair, all tokens that are both spatially between the tokens of the pair, and satisfy the following criteria:.
1. The "between" token has a color close to the line in RGB space that extends between the colors of the tokens of the respective pair (to satisfy a monotonic linear transition condition).
2. The "between" token has a seed size of at most $s_2$, (for example, $s_2$=2).
3. The "between" token has at most $p_2$ pixels, (for example, $p_2$=20).

In step 206, the CPU 12 records, for each identified "between" token, the pair of tokens it is located between and the position of its color along the color line in RGB space between the colors of the respective token pair.

In step 208, the CPU 12 modifies the material image based upon the information recorded for "between" tokens. According to a feature of the present invention, the CPU 12 identifies tokens in the material image that correspond, pixel by pixel, to the tokens of the input image file 18. The CPU 12 then proceeds to recolor each corresponding "between" token of the material image, to be the color at the same fractional distance along the color line in RGB space between the colors of the respective corresponding token pair.

In step 210, the CPU 12 recalculates the illumination image, as a function of the re-colored material image, by execution of the I=ML equation.

Moreover, detail of the image may appear in the illumination image. Execution of the I=ML equation can result in image detail being forced into the illumination image. To force the detail back into the material image, the illumination image is blurred by passing the image through a bilateral blurring filter, and then the material image is recalculated.

Referring once again to FIG. 8, in step 114, the CPU 12 outputs a material reflectance image (material map 62 of FIGS. 3 and 4) and an illumination image (illumination map 60 of FIGS. 3 and 4).

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. An automated, computerized method for processing an image, comprising the steps of:
providing an image file depicting an image, in a computer memory;
assembling a feature vector for the image file, the feature vector containing information regarding a likelihood that a selected region of the image file is specular, the selected region of the image being a type-C token having a single robust color measurement among contiguous pixels thereof;
providing a classifier derived from a computer learning technique;
computing a classification score for the selected region of the image file, as a function of the feature vector and the classifier;
classifying the region as being specular, as a function of the classification score; and
processing the image to remove specular characteristics from the region classified as being specular,
wherein the processing the image to remove specular characteristics from the region classified as being specular includes modifying gradients of all the pixels within the region classified as being specular to remove specular characteristics.

2. The method of claim 1 wherein the feature vector comprises Gabor filter features.

3. The method of claim 2 wherein the Gabor filter features are computed in each one of a set of different color spaces.

4. The method of claim 3 wherein the set of different color spaces comprises an RGB space, an SUV space, an HSV space, a log RGB space, and a color opponent space.

5. The method of claim 2 wherein the Gabor filter features are computed in each of different orientations and wavelengths.

6. The method of claim 5 wherein the different orientations and wavelengths include orientations of 0, 45, 90 and 135 degrees and wavelengths of 6 pixels and 4 pixels, respectively.

7. The method of claim 1 wherein the feature vector comprises cues characteristic of specularity in an image.

8. The method of claim 1 comprising the further step of selecting the region of the image file for classification upon a determination that the region is saturated.

9. The method of claim 1 comprising the further step of selecting the region of the image file for classification upon a determination that the region satisfies specularity conditions in a source dependent color space.

10. The method of claim 1 comprising the further step of, when the selected region is classified as being specular, setting an indication in a specular mask.

11. The method of claim 1 wherein the selected region of the image comprises a token.

12. The method of claim 1, wherein the processing the image to remove specular characteristics from the region classified as being specular includes reintegrating a gradient representation of the image, with the modified gradients, to regenerate the image without specularities.

13. The method of claim 12 further comprising restoring texture the region after the image is regenerated.

14. A computer system which comprises:
a CPU; and
a memory storing an image file containing an image;
the CPU arranged and configured to execute a routine to assemble a feature vector for the image file, the feature vector containing information regarding a likelihood that a selected region of the image file is specular, the selected region of the image being a type-C token having a single robust color measurement among contiguous pixels thereof, provide a classifier derived from a computer learning technique, compute a classification score for the selected region of the image file, as a function of the feature vector and the classifier, classify the region as being specular, as a function of the classification score, and process the image to remove specular characteristics from the region classified as being specular,
wherein the processing the image to remove specular characteristics from the region classified as being specular includes modifying gradients of all the pixels within the region classified as being specular to remove specular characteristics.

15. The computer system of claim 14, wherein the processing the image to remove specular characteristics from the region classified as being specular includes reintegrating a gradient representation of the image, with the modified gradients, to regenerate the image without specularities.

16. The computer system of claim 15 further comprising restoring texture the region after the image is regenerated.

17. A computer program product, disposed on a non-transitory computer readable medium, the product including computer executable process steps operable to control a computer to: assemble a feature vector for an image file, the feature vector containing information regarding a likelihood that a selected region of the image file is specular, the selected region of the image being a type-C token having a single robust color measurement among contiguous pixels thereof, provide a classifier derived from a computer learning technique, compute a classification score for the selected region of the image file, as a function of the feature vector and the classifier, classify the region as being specular, as a function of the classification score, and process the image to remove specular characteristics from the region classified as being specular,
wherein the processing the image to remove specular characteristics from the region classified as being specular includes modifying gradients of all the pixels within the region classified as being specular to remove specular characteristics.

18. The computer program product of claim 17, wherein the feature vector comprises Gabor filter features.

19. The computer program product of claim 18 wherein the Gabor filter features are computed in each one of a set of different color spaces.

20. The computer program product of claim 19 wherein the set of different color spaces comprises an RGB space, an SUV space, an HSV space, a log RGB space, and a color opponent space.

21. The computer program product of claim 18 wherein the Gabor filter features are computed in each of different orientations and wavelengths.

22. The computer program product of claim 21 wherein the different orientations and wavelengths include orientations of 0, 45, 90 and 135 degrees and wavelengths of 6 pixels and 4 pixels, respectively.

23. The computer program product of claim 17 wherein the feature vector comprises cues characteristic of specularity in an image.

24. The computer program product of claim 17 comprising the further step of selecting the region of the image file for classification upon a determination that the region is saturated.

25. The computer program product of claim 17 comprising the further step of selecting the region of the image file for classification upon a determination that the region satisfies specularity conditions in a source dependent color space.

26. The computer program product of claim 25, wherein a bi-illuminant dichromatic reflection model is used to calculate an illumination source color.

27. The computer program product of claim 17 comprising the further step of, when the selected region is classified as being specular, setting an indication in a specular mask.

28. The computer program product of claim 17 wherein the selected region of the image comprises a token.

29. The computer program product of claim 17, wherein the processing the image to remove specular characteristics from the region classified as being specular includes generating a material image expressed as a separate, multi-band representation, independent of an illumination image, the material image excluding the region classified as being specular.

30. The computer program product of claim 17, wherein the image region has a single robust color measurement among contiguous pixels thereof if all of the pixels of a Type C token have colors within a noise level of a device used to record the image.

31. The computer program product of claim 17, wherein the processing the image to remove specular characteristics from the region classified as being specular includes blurring the region classified as being specular.

32. The computer program product of claim 17, wherein the processing the image to remove specular characteristics from the region classified as being specular includes reintegrating a gradient representation of the image, with the modified gradients, to regenerate the image without specularities.

33. The computer program product of claim 32 further comprising restoring texture the region after the image is regenerated.

* * * * *